W. M. MITCHELL.
CAR DERAILING DEVICE.
APPLICATION FILED AUG. 12, 1908.
923,683.
Patented June 1, 1909.
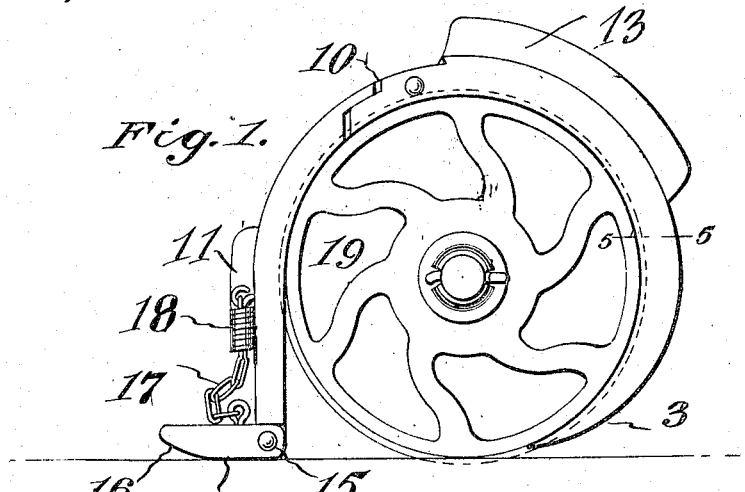
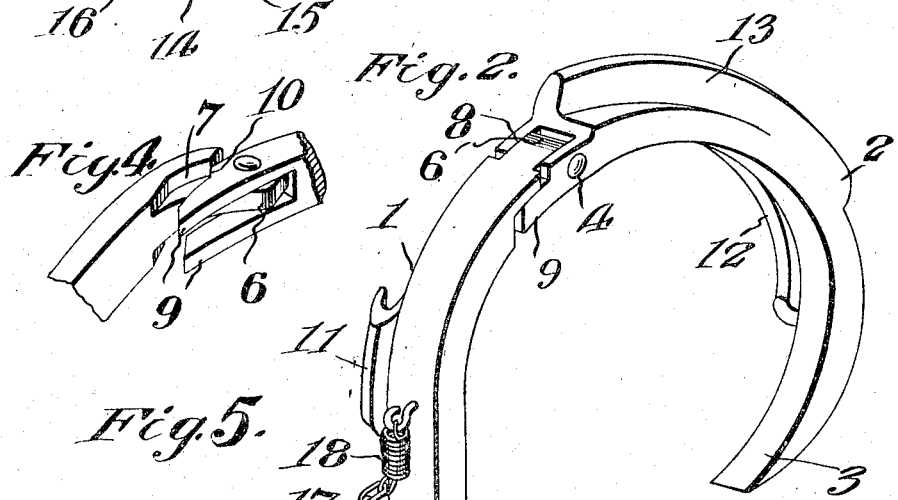
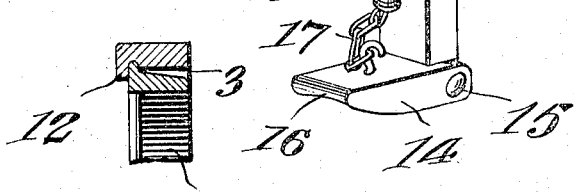
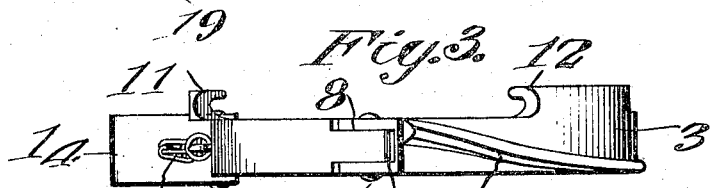
Inventor,
Walter M. Mitchell.
By Victor J. Evans.
Attorney
Witnesses:
Joe. P. Wahler.
C. C. Hines.

UNITED STATES PATENT OFFICE.

WALTER M. MITCHELL, OF PRATT CITY, ALABAMA.

CAR-DERAILING DEVICE.

No. 923,683.

Specification of Letters Patent.

Patented June 1, 1909.

Application filed August 12, 1908. Serial No. 448,225.

*To all whom it may concern:*

Be it known that I, WALTER M. MITCHELL, a citizen of the United States, residing at Pratt City, in the county of Jefferson and State of Alabama, have invented new and useful Improvements in Car-Derailing Devices, of which the following is a specification.

This invention relates to a derailing device adapted for use upon the tram cars of inclined railways where the cars are liable to break loose and run back by gravity down the track, the main object of the invention being to provide a device of this character which may be readily and conveniently applied to one of the rear wheels of the rear car of a train to automatically derail the car when the train parts at any point to prevent the train from descending the grade and bring it to an immediate stop.

A further object of the invention is to provide a device of this character which is independent in structure of the car frame and wheels, and is designed to be readily and easily mounted upon the proper wheel of any car of ordinary construction, thus rendering it adaptable for general use, and which is further designed to permit a limited rearward movement of the car without derailing action, as when the car moves backward a slight distance in starting the train.

A still further object of the invention is to provide a derailing device which is supported solely upon the wheel in connection with which said device is used, and which is provided with means for securing it against disengagement and preventing it from binding objectionably upon the wheel.

With these and other objects in view, the invention consists of the features of construction, combination and arrangement of parts hereinafter fully described and claimed, reference being had to the accompanying drawing, in which:—

Figure 1 is a side elevation of the device as applied for operation to the wheel of a car. Fig. 2 is a perspective view of the device detached. Fig. 3 is a top plan view of the same. Fig. 4 is a detail perspective showing the pivotal connection between the sections of the device. Fig. 5 is a detail cross section on line 5—5 of Fig. 1.

The improved derailing device constituting my invention comprises a pair of bars or sections 1 and 2, of curved form to rest upon and partially surround the wheel of a car. The bars conform substantially in width with the tread surface of the wheel, and may be made of cast steel or other suitable material. The front section 1 is adapted to rest upon the upper front surface of the wheel and is curved to conform thereto, while its lower end is straight and vertical and of proper length to terminate a short distance above the track rail. The rear section 2 rests upon and is of proper curvature to conform to that portion of the contour of the tread of the wheel between the upper rear end of the front section and the lower rear portion of the tread of the wheel to a point above and in rear of the portion of tread immediately in contact with the rail, the outer face of the lower end of said rail section being beveled substantially to a point, as shown at 3. By this construction, the wheel is permitted to have a partial rearward rotation before the point 3 of the section 2 of the device, which turns rearwardly with the wheel, comes into contact with the rail and between the rail and tread of the wheel, whereby the wheel is lifted and derailed, as hereinafter described.

In order to adapt the device to be readily engaged with and disengaged from a wheel and rest loosely thereon during the forward movement of the wheel, the meeting ends of the sections 1 and 2 are pivotally connected by a pivot pin or bolt 4. The upper rear end of the front section 1 is reduced to provide a tongue 6 which projects beyond the same and is recessed at opposite sides to form shoulders 7, while the upper forward end of the section 2 is formed with a slot 8 to receive the tongue and provided with forwardly extending bracing arms 9 adapted to enter said recesses, the upper faces of said arms being cut away to form engaging surfaces to rest against the shoulders 7 and to provide auxiliary shoulders 10 to bear against the upper end of the section 1 on opposite sides of the tongue. The pivot pin or bolt 4 passes through the side walls of the slot 8 and the tongue 6 and pivotally connects the parts together, the pivotal motion in one direction being limited by the engagement of the arms 9 with the shoulders 7, and in the reverse direction by the engagement of the auxiliary shoulders 10 with the upper end of the section 1. A relative outward movement of the sections is thus permitted to adapt the device to be spread or opened sufficiently for application to and removal from the wheel, while undue contraction of the device is prevented by the engagement of the arms 9 and shoulders 7, so as to prevent the device from gripping the wheel with sufficient force to act as a partial brake, whereby the device will be loosely supported upon the wheel so as to allow the latter to have free forward rotation.

In order to retain the derailer in working position on the wheel and to properly engage it with the wheel for derailing action, the sections are respectively provided at their inner sides with segmental grooved or channeled flanges 11 and 12 to engage and receive the flange of the wheel, thus preventing lateral or sidewise movement of the derailer and connecting the same positively with the wheel, so that when the derailer exerts an outward pull upon the wheel the latter will be drawn outward off the rail. The section 2 is formed on its outer face with a derailing rib 13, which extends at a diagonal angle outwardly and rearwardly from the inner side of the upper end of said section to the outer lateral face of said section at a point about midway of the circumferential length of the latter, so that the outer end of said rib in the rearward rotation of the wheel to the necessary degree will come in contact with the outer face of the head of the rail and then, as the wheel continues to revolve, will through its diagonal arrangement gradually draw the wheel outwardly until it is finally pulled off the rail, thus derailing the car. It will be understood that the lower tapered portion of the section 2 below the rib passes under the wheel and between the same and the head of the rail and lifts the wheel in its rearward rotation so that the wheel may be derailed without resistance from the flange thereof.

A supporting shoe 14 is pivotally mounted upon the lower straight end of the section 1, as at 15, and is adapted to slide upon the rail in advance of the wheel during the forward movement of the car and to support the derailing device and prevent it from being moved forward and out of working position by the motion of the wheel. The shoe has a beveled or inclined toe portion 16, for a purpose hereinafter described, and is connected by a chain or like flexible connection 17 with a coiled spring 18 connected with the straight portion of the section 1 at a suitable elevation above the pivotal connection of the shoe.

In the operation of the device, which is loosely mounted upon one of the rear wheels of a single car or last car of a train, the normal position of the parts is maintained while the car is stationary or in forward motion, the wheel turning independently of the derailer, which is maintained in working position by the supporting action of the shoe sliding on the rail. If there should be a break in the hoisting rope or cable or the cars of the train should part from any cause, the wheel 19 in rotating rearwardly will elevate the shoe from the rail and carry the derailing device around with it, so that the point or tapered portion 3 of the rear section will come in contact with the rail and lift the wheel out of engagement therewith, whereby upon the further movement of the wheel the rib 13 will engage the rail and derail the wheel and stop the car. It will be observed that the elevating portion of the section 2 is of sufficient circumferential length to adapt the wheel to have a partial rearward movement before the derailing rib comes into action, by which the car or train will be permitted to have the ordinary slight backward motion before the pull of the hoisting engine or cable begins thereon without derailing the car. This slight backward movement will lift the shoe 14 from the rail, but on the subsequent forward movement of the wheel the beveled toe of the shoe, which is permitted to drop to a nearly vertical position by the flexible connection 17, comes in contact with the rail and readily adjusts itself to working position without injury. It will be understood that the spring yieldingly limits the downward movement of the shoe and supports it at the proper angle for an easy return to normal position as above described.

From the foregoing description, the construction and mode of operation of my improved derailing device will be readily understood, and it will be seen that it provides a simple and effective device of this character which may be readily applied to and removed from a car wheel, which is independent in construction of the wheel or car frame, and which embodies substantial advantages due to its peculiar construction alone.

Having thus fully described the invention what is claimed as new is:

1. A car derailing device adapted to partially encircle and rest loosely upon a wheel and having means for engaging the flange of the wheel, said device comprising front and rear pivotally connected sections, the rear section having a lower wheel elevating portion and an upper diagonally arranged derailing rib, and the front section being provided at its lower end with a pivotally mounted supporting shoe to run upon the rail.

2. A car derailing device adapted to partially encircle and rest loosely upon a wheel and having means for engaging the flange of the wheel, said device comprising front and rear pivotally connected sections, the rear section having a lower wheel elevating portion and an upper diagonally arranged derailing rib, and the front section being provided at its lower end with a pivotally mounted supporting shoe to run upon the rail, and spring controlled supporting means for limiting the downward movement of the shoe.

3. A car derailing device of partially circular form to rest loosely upon and partially encircle a wheel and having means for engaging the flange of the wheel, said device comprising front and rear sections, said sections being pivotally connected at their meeting ends and having stop shoulders at the pivotal point to limit the opposite pivotal movements thereof, the rear section having a lower wheel elevating portion and an upper diagonally arranged derailing rib, and the front section being provided at its lower end with a pivotally mounted supporting shoe to run upon the rail.

4. A car derailing device comprising a pair of partially circular bars pivotally connected at their meeting ends and provided with means for limiting their pivotal movement on each other, said bars being adapted to rest loosely upon a wheel and provided with flanges to engage the flange of the wheel, the front bar being provided at its lower end with a pivotally supported shoe and means for flexibly limiting the downward movement thereof, and the rear bar being provided with a tapered lower wheel elevating portion and a diagonally arranged derailing rib above the same.

5. A car derailing device of partially circular form to loosely rest upon and partially encircle a wheel, said device being provided with means to interlock with the flange of the wheel and comprising jointed sections, one of said sections being provided with a yieldably mounted supporting member to engage and ride upon the track rail and the other section having a lower wheel elevating portion and a derailing rib arranged above the same.

In testimony whereof I affix my signature in presence of two witnesses.

WALTER M. MITCHELL.

Witnesses:
L. N. KING,
W. W. POWELL.